(No Model.)

J. COOK.
DRINKING FOUNTAIN FOR POULTRY.

No. 315,251. Patented Apr. 7, 1885.

Witnesses:
John Memmu
G. H. Simmons

Inventor:
Joseph Cook,
by C. P. Humphrey
Atty.

UNITED STATES PATENT OFFICE.

JOSEPH COOK, OF AKRON, OHIO.

DRINKING-FOUNTAIN FOR POULTRY.

SPECIFICATION forming part of Letters Patent No. 315,251, dated April 7, 1885.

Application filed August 4, 1884. (No model.)

*To all whom it may concern:*

Be it known that I, JOSEPH COOK, a citizen of the United States, residing at Akron, in the county of Summit and State of Ohio, have invented a new and useful Improvement in Drinking-Fountains for Poultry, of which the following is a specification.

My invention has relation to that class of vessels used for keeping a continuous supply of water in poultry pens and coops, which consist of a large closed receptacle and a shallow open vessel integral therewith, the two being connected by an orifice at the bottom of the former and below the surface of the water in the latter. These have heretofore been commonly constructed of earthenware turned by hand in jug form, with a flat base and closed top, having a niche in one side at the bottom, surrounded by a curb, forming a shallow open pan, and connected with the inside of the jug by a small orifice. These are objectionable for various reasons. The manufacture by hand renders them expensive. The shape prevents their being closely packed in the kiln, or for transportation. Lacking anything for the hand to grasp, they are inconvenient to handle, and they are only filled by being wholly immersed in a larger vessel.

The objects of my invention are, to produce a vessel having all the advantages of the other, without its objectionable features, and which may be manufactured by machinery, may be burned in "stands," and closely packed for transportation, and may be readily handled and easily filled.

Figure 1:
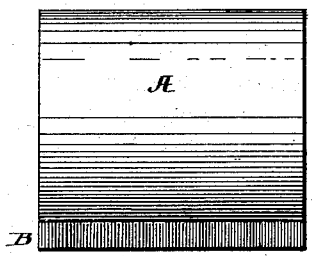
Figure 2:
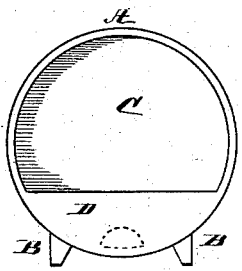
Figure 3:
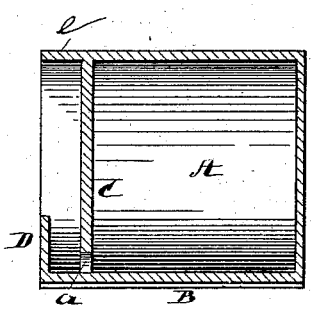

My invention is illustrated in the accompanying drawings, in which Figure 1 is a side elevation, Fig. 2 an end elevation, and Fig. 3 a central longitudinal vertical section, of my improved poultry-fountain.

A is a hollow earthenware cylinder, closed at one end, having at the other a partial head, D, which extends about one-third across the end, and back of this a short distance is a partition, C, which entirely closes the cylinder, but pierced with an orifice, *a*. Upon the outside of A, and on the side occupied by D, are two longitudinal ribs, B B, upon which the vessel rests in a horizontal position. These fountains can be turned by machinery, can be placed in stands for burning, and can be packed closely for transportation. The partial head D forms a handle, and the rim *e*, projecting beyond the partition C, constitutes a funnel for filling.

I claim—

A drinking-fountain for poultry, consisting of a hollow earthenware cylinder, A, having longitudinal ribs B upon its under side, closed at one end, and having a partition, C, near the other, said partition being provided with an orifice, *a*, near its lower edge, the rim *e*, and partial head D, extending across said rim, substantially as shown and described.

In testimony that I claim the foregoing I have hereunto set my hand this 12th day of July, A. D. 1884.

JOSEPH COOK.

Witnesses:
C. P. HUMPHREY,
E. W. STUART.